United States Patent
Uchiyama

(10) Patent No.: US 8,380,933 B2
(45) Date of Patent: Feb. 19, 2013

(54) MULTIPROCESSOR SYSTEM INCLUDING PROCESSOR CORES AND A SHARED MEMORY

(75) Inventor: Masato Uchiyama, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 894 days.

(21) Appl. No.: 12/053,862

(22) Filed: Mar. 24, 2008

(65) Prior Publication Data

US 2008/0244192 A1    Oct. 2, 2008

(30) Foreign Application Priority Data

Mar. 20, 2007  (JP) ................................ 2007-087188

(51) Int. Cl.
*G06F 12/00* (2006.01)

(52) U.S. Cl. ................ 711/141; 711/E12.026; 711/144; 711/151; 712/227

(58) Field of Classification Search .................... 711/151
See application file for complete search history.

(56) References Cited

U.S. PATENT DOCUMENTS

| | | | | |
|---|---|---|---|---|
| 5,319,766 | A | * | 6/1994 | Thaller et al. .................. 711/146 |
| 5,377,336 | A | * | 12/1994 | Eickemeyer et al. ......... 712/207 |
| 5,418,973 | A | * | 5/1995 | Ellis et al. .......................... 712/3 |
| 5,913,226 | A | | 6/1999 | Sato |
| 7,000,220 | B1 | * | 2/2006 | Booth ........................... 717/110 |

FOREIGN PATENT DOCUMENTS

| | | |
|---|---|---|
| JP | 2-275551 | 11/1990 |
| JP | 7-281956 | 10/1995 |
| JP | 9-185547 | 7/1997 |
| JP | 10-307748 | 11/1998 |
| JP | 2006-213432 | 8/2006 |
| JP | 2006-293824 | 10/2006 |
| WO | WO 2004/107180 A1 | 12/2004 |
| WO | WO 2006/043227 A1 | 4/2006 |

OTHER PUBLICATIONS

Office Action issued Jan. 31, 2012 in Japan Application No. 2007-087188 (With English Translation).

* cited by examiner

*Primary Examiner* — Hashem Farrokh
*Assistant Examiner* — Larry MacKall
(74) *Attorney, Agent, or Firm* — Oblon, Spivak, McClelland, Maier & Neustadt, L.L.P.

(57) ABSTRACT

A multiprocessor system includes cache memories each of which is provided in correspondence with one of processor cores and includes a tag storage unit configured to store validity information representing whether a cache line as a unit to store data is valid, update information representing whether data in the cache line has been rewritten, and address information of the data in the cache line, a shared memory shared by the processor cores, and an arbitration circuit configured to arbitrate access requests from the processor cores to the shared memory and send the arbitrated access request to the cache memories. Each cache memory includes a violation detection circuit configured to detect a violation access by comparing the information in the tag storage unit with the access request from the arbitration circuit.

17 Claims, 10 Drawing Sheets

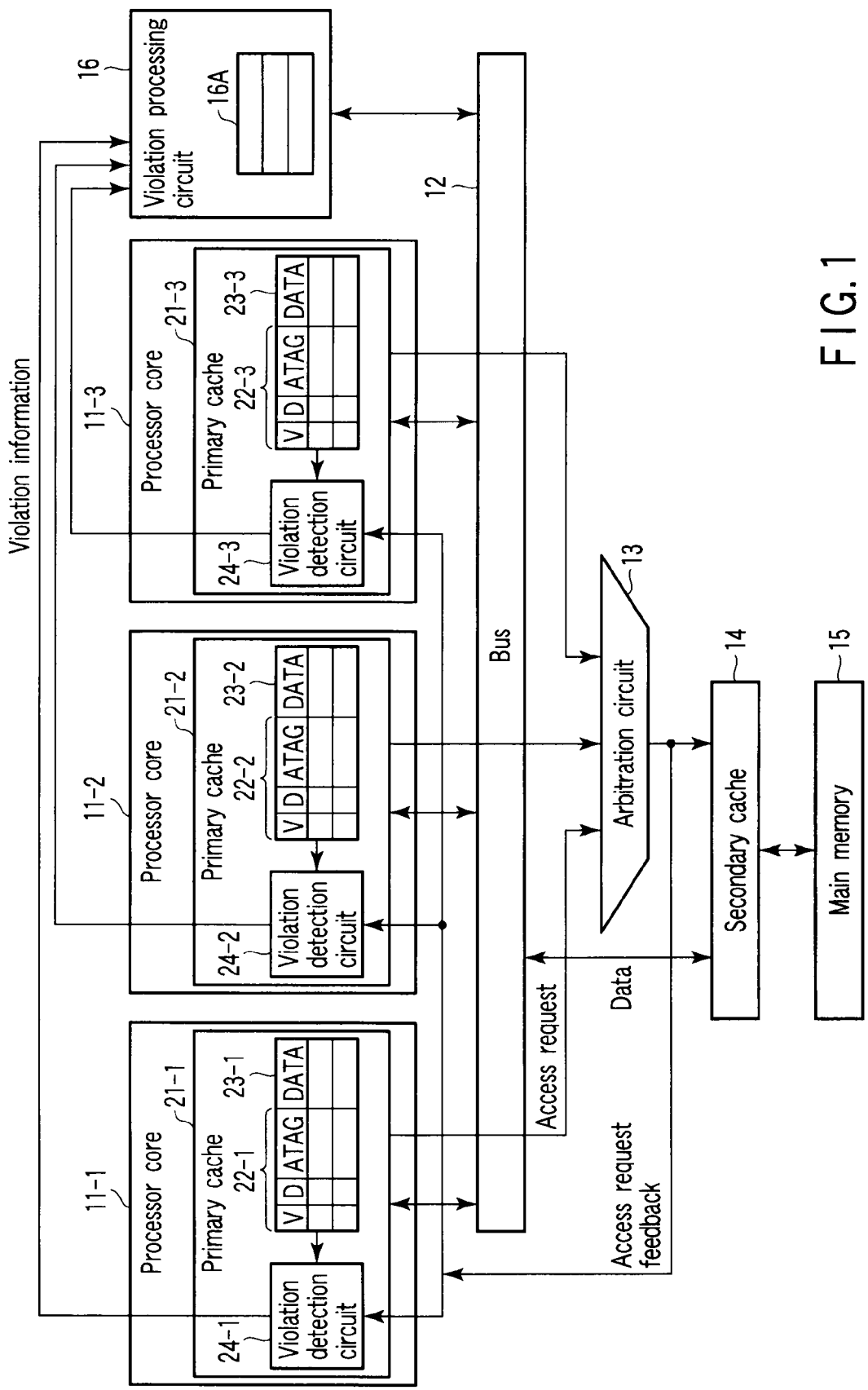
F I G. 1

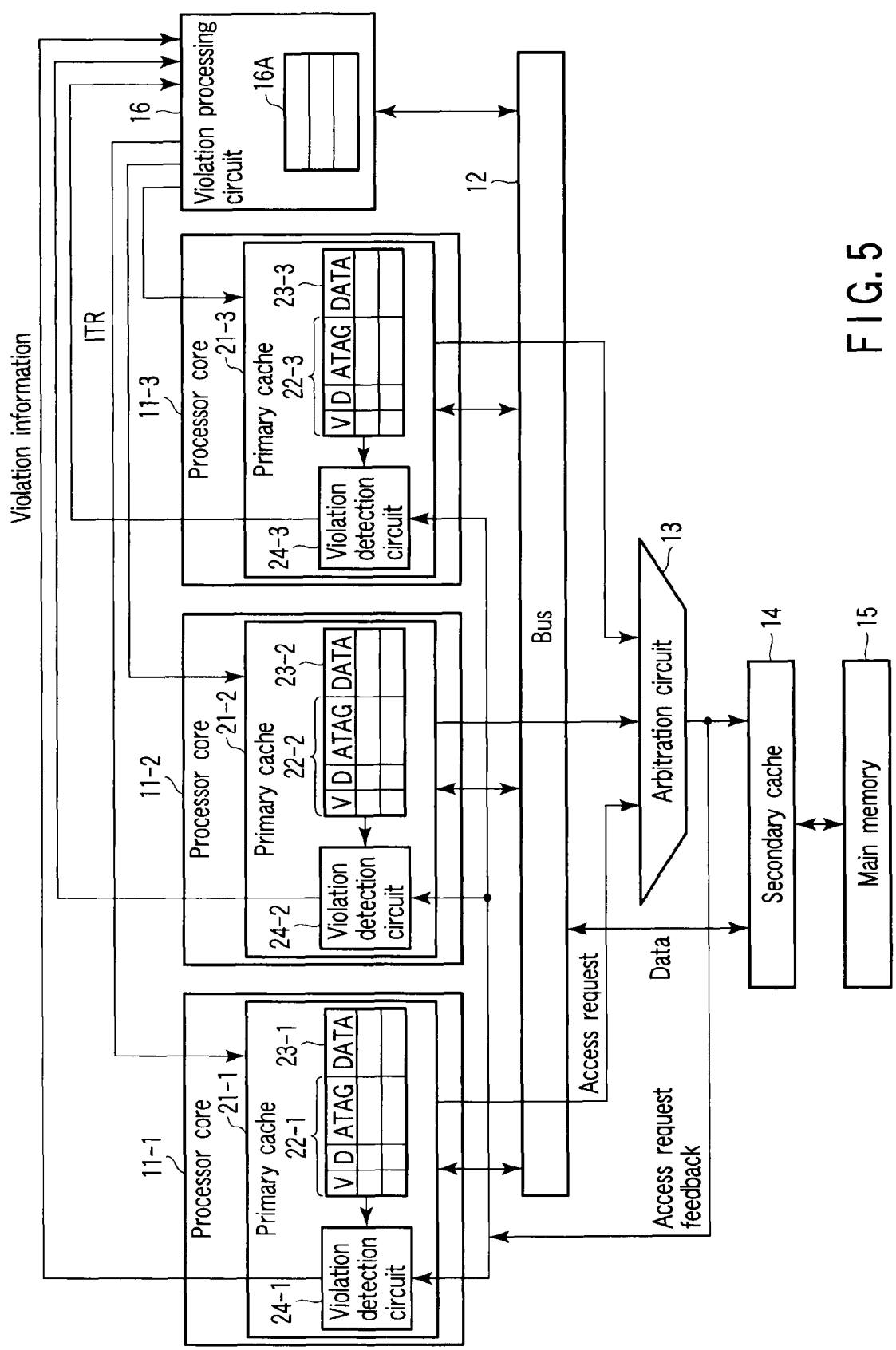
F I G. 5

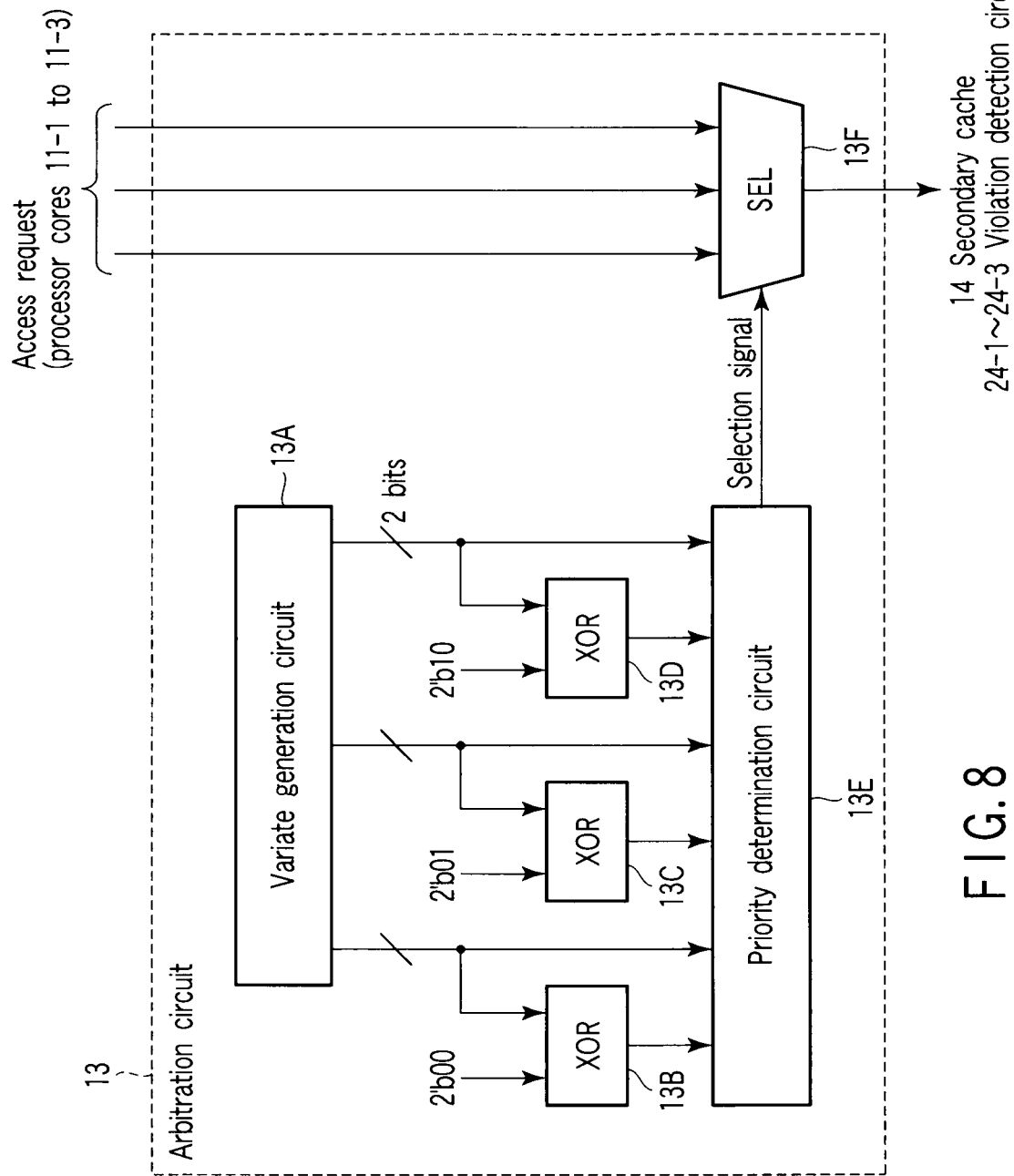
F I G. 8

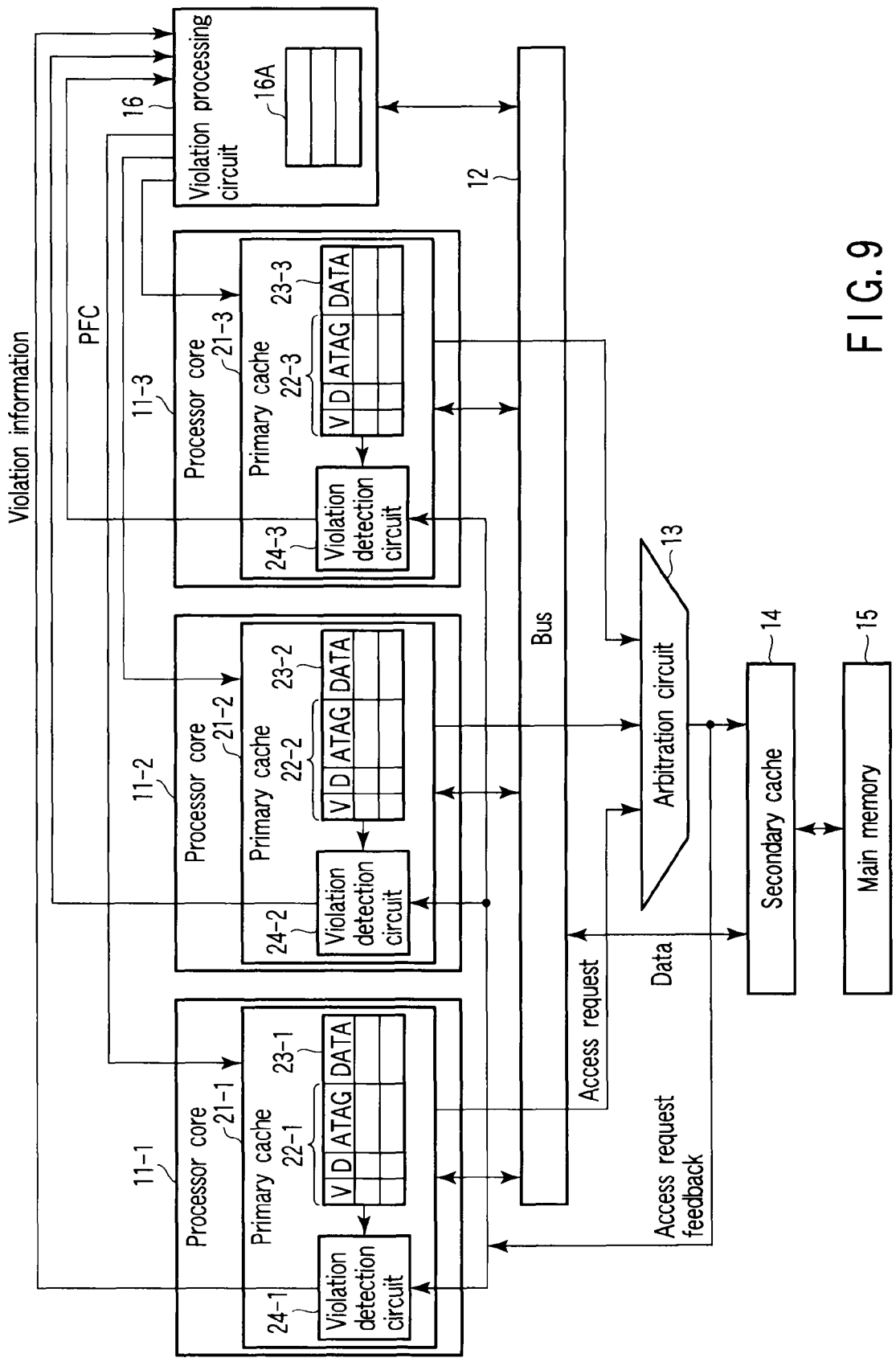
F I G. 9

MULTIPROCESSOR SYSTEM INCLUDING PROCESSOR CORES AND A SHARED MEMORY

CROSS-REFERENCE TO RELATED APPLICATIONS

This application is based upon and claims the benefit of priority from prior Japanese Patent Application No. 2007-087188, filed Mar. 29, 2007, the entire contents of which are incorporated herein by reference.

BACKGROUND OF THE INVENTION

1. Field of the Invention

The present invention relates to a multiprocessor system having a plurality of processor cores, and more particularly, to a multiprocessor system having, e.g., a shared memory shared by a plurality of processor cores.

2. Description of the Related Art

Recently, a multiprocessor system that connects a plurality of processor cores via a shared bus has been developed in the expectation that it could greatly improve the processing performance of a computer apparatus. The operation frequency of a processor core tends to be higher every year. However, an external memory (shared memory) used as a main memory is not so fast as the processor core. The gap between the processor core and the external memory is generally filled using a cache memory. In the cache mechanism of a processor core, the processor core incorporates a primary cache.

Snoop caching is known as a system for maintaining the cache coherency of a shared memory system having a hierarchical structure of a shared memory and primary caches. The snoop cache system maintains the cache coherency by causing each primary cache to exchange update information and the like with itself or the primary cache of another processor core.

However, to maintain the coherency, various kinds of processes including bus transaction monitoring, access information transmission, and forced write-back of latest data to the shared memory occur. This deteriorates the performance and power consumption of the multiprocessor system.

In a system without a cache coherency maintaining mechanism by hardware, shared memory access rules for maintaining the coherency are defined. The primary caches comply with the rules, thereby maintaining the coherency. A relationship between the plurality of processor cores creates a situation that impedes coherency maintenance. Verifications in an amount executable by simulations often fail to find violation accesses. Additionally, it is difficult to cause a simulator to reproduce a violation access detected in a multiprocessor system implemented on a chip, and a long time is necessary to specify the problem.

A related technique of this type is disclosed, which executes high-speed data transfer between cache memories while maintaining the cache coherency in a multiprocessor system formed by connecting a plurality of processor cores to a shared memory via a shared bus (Jpn. Pat. Appln. KOKAI Publication No. 9-185547).

BRIEF SUMMARY OF THE INVENTION

According to a first aspect of the present invention, there is provided a multiprocessor system comprising: a plurality of processor cores to be debugged; a plurality of cache memories each of which is provided in correspondence with one of the processor cores and includes a tag storage unit configured to store validity information representing whether a cache line as a unit to store data is valid, update information representing whether data in the cache line has been rewritten, and address information of the data in the cache line; a shared memory shared by the processor cores; and an arbitration circuit configured to arbitrate a plurality of access requests from the processor cores to the shared memory and send the arbitrated access request to the cache memories, each of the access requests including a first identification signal representing that the data in the cache line has been rewritten. Each cache memory includes a violation detection circuit configured to detect a violation access by comparing the information in the tag storage unit with the access request from the arbitration circuit.

According to a second aspect of the present invention, there is provided a multiprocessor system comprising: a plurality of processor cores to be debugged; a plurality of cache memories each of which is provided in correspondence with one of the processor cores and includes a tag storage unit configured to store validity information representing whether a cache line as a unit to store data is valid, update information representing whether data in the cache line has been rewritten, and address information of the data in the cache line; a shared memory shared by the processor cores; an arbitration circuit configured to arbitrate a plurality of access requests from the processor cores to the shared memory and send the arbitrated access request to the cache memories, each of the access requests including a first identification signal representing that the data in the cache line has been rewritten; and an interrupt circuit configured to generate an interrupt for a processor core upon detecting a violation access. Each cache memory includes a violation detection circuit configured to detect a violation access by comparing the information in the tag storage unit with the access request from the arbitration circuit.

According to a third aspect of the present invention, there is provided a multiprocessor system comprising: a plurality of processor cores to be debugged; a plurality of cache memories each of which is provided in correspondence with one of the processor cores and includes a tag storage unit configured to store validity information representing whether a cache line as a unit to store data is valid, update information representing whether data in the cache line has been rewritten, and address information of the data in the cache line; a shared memory shared by the processor cores; and an arbitration circuit configured to arbitrate a plurality of access requests from the processor cores to the shared memory and send the arbitrated access request to the cache memories, each of the access requests including a first identification signal representing that the data in the cache line has been rewritten. Each cache memory includes a violation detection circuit configured to detect a violation access by comparing the information in the tag storage unit with the access request from the arbitration circuit. The arbitration circuit changes, at random, priority orders of the processor cores to be allocated when accesses from the processor cores conflict.

BRIEF DESCRIPTION OF THE SEVERAL VIEWS OF THE DRAWING

FIG. 1 is a block diagram illustrating a multiprocessor system according to the first embodiment of the present invention;

FIG. 5 is a block diagram illustrating a multiprocessor system according to the second embodiment of the present invention;

FIG. 8 is a block diagram illustrating an arbitration circuit 13 according to the fourth embodiment of the present invention;

FIG. 9 is a block diagram illustrating a multiprocessor system according to the fifth embodiment of the present invention;

DETAILED DESCRIPTION OF THE INVENTION

Figure 2:
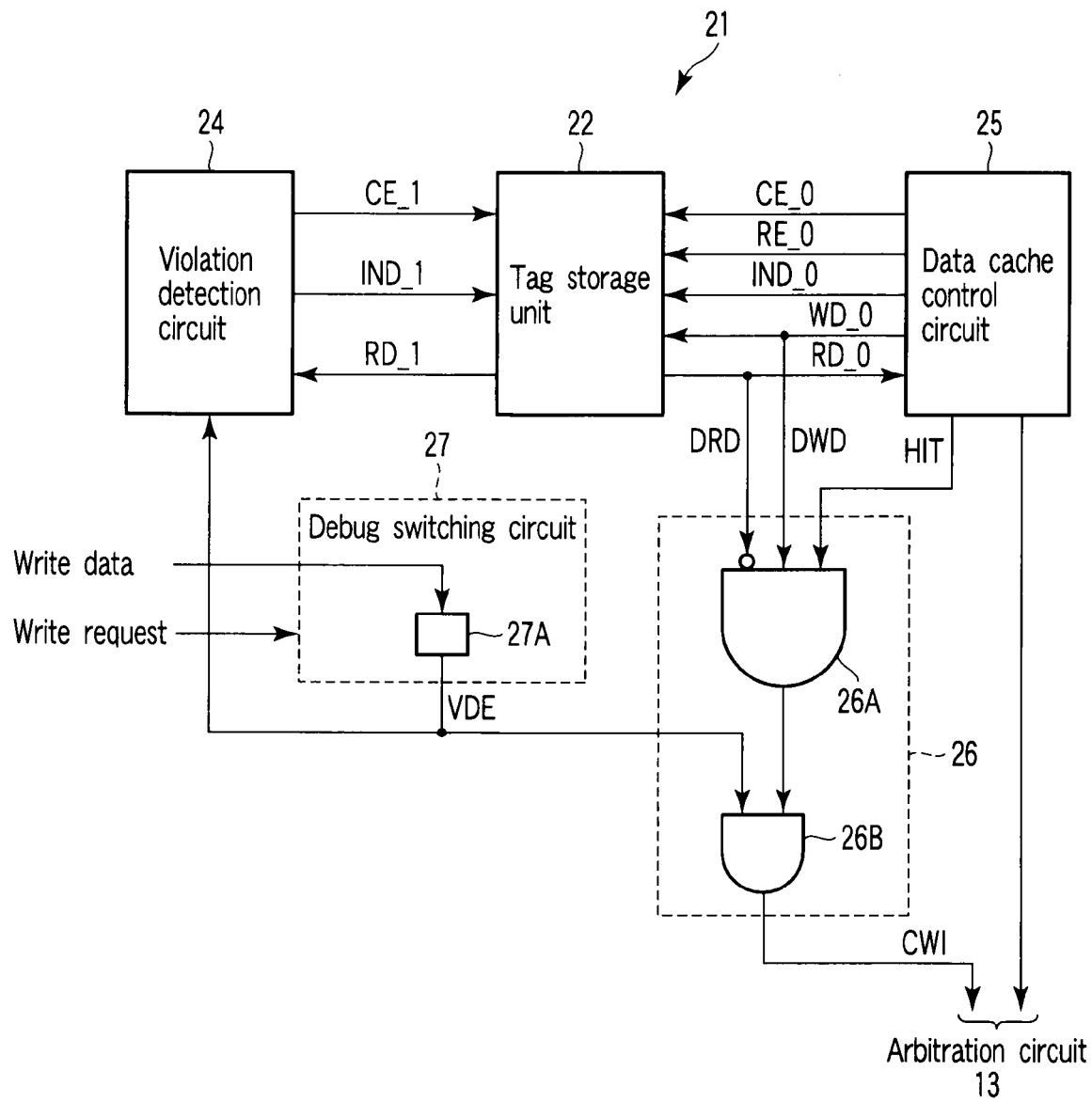
FIG. 2 is a block diagram illustrating a primary cache 21 shown in FIG. 1.

The embodiments of the present invention will now be described with reference to the accompanying drawing. The same reference numerals denote elements having the same functions and arrangements throughout the following description, and a repetitive description will be made only if necessary.

(First Embodiment)

FIG. 1 is a block diagram illustrating a multiprocessor system according to the first embodiment of the present invention. The multiprocessor system shown in FIG. 1 is formed as a system LSI (Large-Scale Integrated Circuit) implemented on a chip.

The multiprocessor system includes a plurality of processor cores 11, an arbitration circuit 13, a secondary cache 14 serving as a shared memory, a main memory 15, and a violation processing circuit 16. In this embodiment, three processor cores 11-1 to 11-3 are shown as an example.

Each processor core 11 is a CPU (Central Processing Unit) for controlling the operation of the system. The processor core 11 controls the cache memories and other circuits by executing a program stored in the main memory 15. It is possible to largely speed up processing by dividing contents to be processed by the LSI into a plurality of tasks and parallelly operating the processor cores having arrangements optimum for the tasks.

Each processor core 11 accesses the main memory 15 via a bus 12 and the secondary cache 14. In this embodiment, the secondary cache 14 serving as a shared memory is not always necessary. Each processor core 11 may directly access the main memory 15 serving as a shared memory via the bus 12.

Each processor core 11 has a primary cache memory (primary cache) 21. The primary cache 21 includes a tag storage unit 22, and a data storage unit 23 for storing data. The tag storage unit 22 and data storage unit 23 store a tag and data for each cache line.

The tag storage unit 22 stores attribute information about data in a cache line. More specifically, the tag storage unit 22 stores a valid bit (V), dirty bit (D), and address tag (ATAG). The address tag (ATAG) indicates the address information of data stored in the data storage unit 23 of the cache line.

The valid bit (V) indicates whether data in the cache line is valid. More specifically, the valid bit (V) indicates whether data in the cache line is valid as data of the shared memory represented by the index of the cache line and an address tag.

For example, when the valid bit (V) is "1", the data in the cache line is valid. When the valid bit (V) is "0", the data in the cache line is invalid.

The dirty bit (D) indicates whether the data in the cache line is updated and needs to be written back to the shared memory. More specifically, the dirty bit (D) indicates that data in a cache line of the primary cache is rewritten so that the processor core that has executed the rewrite has the latest data, while the shared memory that is the copy source of the cache line stores only old data. For example, the dirty bit (D) is set to "1" when the data in the cache line is updated but not written back to the shared memory yet.

The arbitration circuit 13 arbitrates the conflict of access requests from the processor cores 11-1 to 11-3 to the secondary cache 14. More specifically, when accesses from the plurality of processor cores to the shared memory via the bus 12 conflict, the arbitration circuit 13 allocates access by a predetermined method. Only one access request is sent to the secondary cache 14 in one cycle. An access request that has not hit the secondary cache 14 is sent to the main memory 15.

An access request sent from each processor core 11 to the secondary cache 14 includes a primary cache write identification signal CWI in addition to items of information such as a processor core number, read/write identification signal, secondary cache direct access and primary cache refill access identification signals, and access destination address. The primary cache write identification signal CWI identifies rewriting (transition) of the dirty bit from "0" to "1". More specifically, the primary cache write identification signal CWI identifies an operation of writing new data to the cache line after the processor core 11 reads data from the shared memory to the primary cache 21.

The secondary cache direct access identification signal identifies an operation of directly accessing the secondary cache without intervention of the primary cache. The primary cache refill access identification signal identifies an operation of accessing the secondary cache after accessing the primary cache once. The upper bits of the access destination address correspond to an address tag, and the lower bits correspond to the index of a cache line.

The multiprocessor system of this embodiment has a feedback path which feeds back, to each processor core 11, an access request sent to secondary cache 14, a violation detection circuit 24 which detects a violation access by comparing the access request that is fed back with information in a cache line held by each processor core 11, and the violation processing circuit 16 which collects, processes, and holds violation information detected by each processor core 11.

FIG. 2 is a block diagram illustrating the primary cache 21. The primary cache 21 includes the violation detection circuit 24, a data cache control circuit 25, a dirty bit transition detection circuit 26, and a debug switching circuit 27 in addition to the above-described tag storage unit 22 and data storage unit 23 (not shown). Of these circuits, the violation detection circuit 24, dirty bit transition detection circuit 26, debug switching circuit 27, and violation processing circuit 16 form a debugging circuit.

The debug switching circuit 27 enables/disables violation access detection by the debugging circuit. The debug switching circuit 27 includes a 1-bit register 27A and enables/disables violation access detection based on the data in the register 27A. The data in the register 27A is set in the following way:

1'b1: enable violation access detection
1'b0: disable violation access detection The data in the register 27A is rewritten, e.g., externally via the bus 12. The data in the register 27A is always output and sent to the violation detection circuit 24 and dirty bit transition detection circuit 26 as a violation detection enable VDE.

The tag storage unit 22 has two access ports (port 0 and port 1). The valid bit (V), dirty bit (D), and address tag (ATAG) stored in the tag storage unit 22 are read simultaneously for each cache line.

The data cache control circuit 25 writes or reads data to or from the tag storage unit 22 and data storage unit 23. The data cache control circuit 25 accesses the tag storage unit 22 using port 0. The data cache control circuit 25 sends a chip enable CE_0, write enable RE_0, cache line index IND_0, and write data WD_0 to the tag storage unit 22. The data cache control circuit 25 also receives read data RD_0 from the tag storage unit 22.

The data cache control circuit 25 also generates a cache hit signal HIT representing whether data has hit in the primary cache 21, and sends the cache hit signal HIT to the dirty bit transition detection circuit 26. The cache hit signal HIT is set to "1" for a cache hit and "0" for a cache miss.

The violation detection circuit 24 accesses the tag storage unit 22 using port 1. The violation detection circuit 24 sends a chip enable CE_1 and cache line index IND_1 to the tag storage unit 22. The violation detection circuit 24 also receives read data RD_1 from the tag storage unit 22.

The data cache control circuit 25 writes data to the tag storage unit 22 and data storage unit 23 in the following two cycles.

"cycle 1": tag information read
"cycle 2": cache hit/miss determination

In cache hit, the data cache control circuit 25 writes data to the tag storage unit 22 and data storage unit 23. In cache miss, the data cache control circuit 25 refill-accesses the shared memory.

The dirty bit transition detection circuit 26 determines using a dirty bit contained in the tag information read in cycle 1 and a dirty bit to be written (updated) in cycle 2 whether the dirty bit is rewritten from "0" to "1". The dirty bit transition detection circuit 26 outputs the determination result as the primary cache write identification signal CWI. The primary cache write identification signal CWI is sent to the arbitration circuit 13.

The dirty bit transition detection circuit 26 includes a 3-input AND circuit 26A and a 2-input AND circuit 26B. The AND circuit 26A receives dirty bit write data DWD, dirty bit read data DRD, and cache hit signal HIT. The AND circuit 26B receives the output from the AND circuit 26A, and the violation detection enable VDE.

The dirty bit transition detection circuit 26 having the arrangement shown in FIG. 2 determines that the dirty bit is rewritten (transited) from "0" to "1" when the following conditions are satisfied, and sets the primary cache write identification signal CWI to "1".

violation detection enable VDE=1 (active)
cache hit signal HIT=1 (hit)
dirty bit write data DWD=1
dirty bit read data DRD=0

As in cache miss, the data cache control circuit 25 sends an access request except the primary cache write identification signal CWI to the arbitration circuit 13. However, both the secondary cache direct access identification signal and the primary cache refill access identification signal are set to "0". More specifically, the access request sent from the data cache control circuit 25 to the arbitration circuit 13 is set in the following way.

processor core number PCN=the core number of the processor
read/write identification signal=0 (read)
secondary cache direct access identification signal=0
primary cache refill access identification signal=0
access destination address=the access destination address of the shared memory If the violation detection enable VDE is "0" (i.e., if violation access detection is disabled), the primary cache write identification signal CWI is fixed at "0". This is the same as in the normal cache access processing. An access request except the primary cache write identification signal CWI is the same as in the normal cache access processing.

Figure 3:
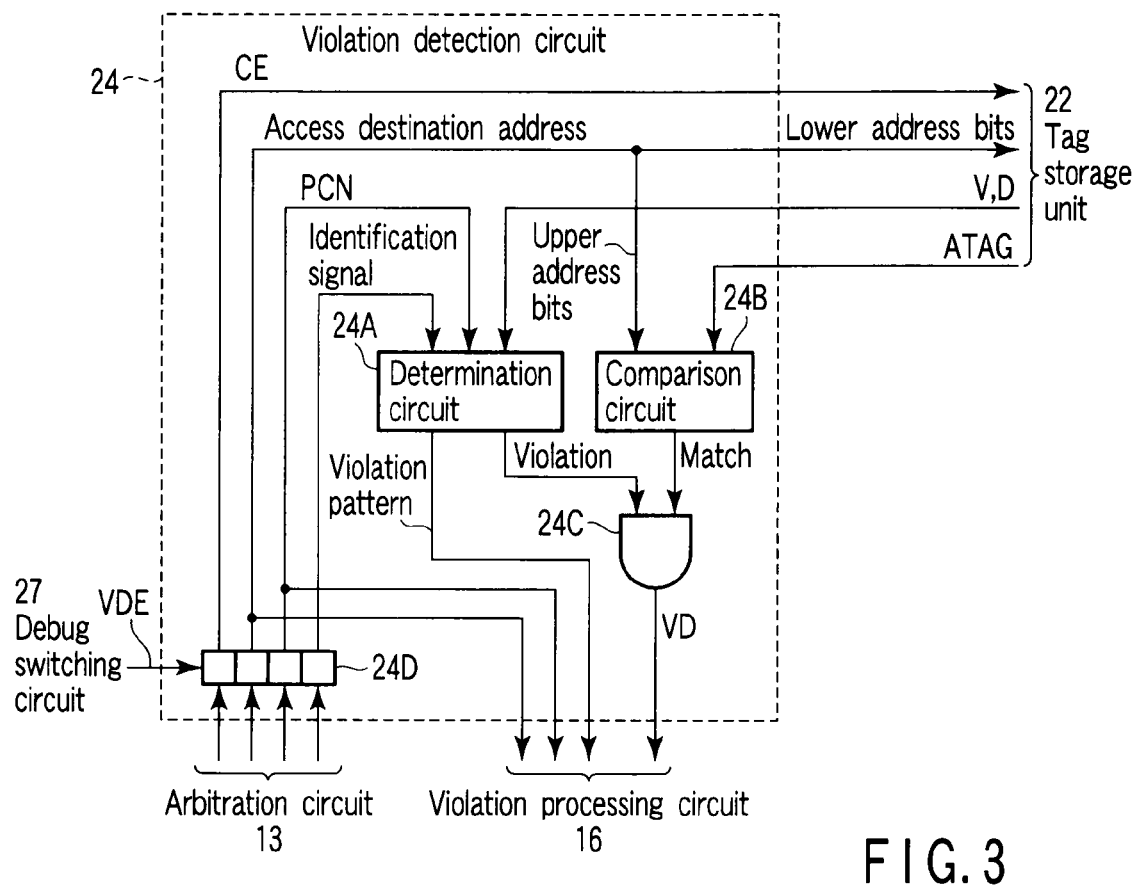
FIG. 3 is a block diagram illustrating a violation detection circuit 24 shown in FIG. 2.

The violation detection circuit 24 detects on the basis of predetermined policies whether the access pattern of the processor core is in violation. FIG. 3 is a block diagram illustrating the violation detection circuit 24. The violation detection circuit 24 includes a determination circuit 24A, comparison circuit 24B, 2-input AND circuit 24C, and register 24D.

The violation detection circuit 24 receives the violation detection enable VDE from the debug switching circuit 27. When the violation detection enable VDE is "1", the violation detection circuit 24 stores, in the register 24D, an access request from the arbitration circuit 13 and detects a violation access using the contents of the access request. When the violation detection enable VDE is "0", the violation detection circuit 24 neglects the access request from the arbitration circuit 13. The violation detection circuit 24 executes violation access detection every time the data in the register 24D is updated.

The violation access detection operation by the violation detection circuit 24 will be described below. As described above, the debug switching circuit 27 sets the violation detection enable VDE to "1" in violation access detection.

First, an access request (chip enable CE, processor core number PCN, read/write identification signal, secondary cache direct access and primary cache refill access identification signals, access destination address, and primary cache write identification signal CWI) arbitrated by the arbitration circuit 13 is sent to the violation detection circuit 24 via the feedback path. The access request is stored in the register 24D.

The violation detection circuit 24 sends, to the tag storage unit 22 as a read request, the chip enable CE stored in the register 24D together with the low bits (corresponding to the cache index) of the access destination address. In response to the read request from the violation detection circuit 24, the valid bit, dirty bit, and address tag of the cache index are read from the tag storage unit 22. The cache index is used to select a block (cache line) of the cache.

The determination circuit 24A processes the valid bit and dirty bit read from the tag storage unit 22 together with the processor core number PCN and the five identification signals (read and write secondary cache direct access identification signals, read and write primary cache refill access identification signals, and primary cache write identification signal CWI) contained in the access request, and determines whether the access pattern is in violation.

The comparison circuit 24B compares the address tag read from the tag storage unit 22 with the upper bits (corresponding to the address tag) of the access destination address and determines whether they indicate the same cache line. If the determination circuit 24A determines that the access pattern is in violation, and the comparison circuit 24B determines that the access destination matches the cache line address held by the processor core, a violation access is detected. The AND circuit 24C executes this violation access detection. The AND circuit 24C outputs a violation detection signal VD.

Upon detecting a violation, the violation detection circuit 24 sends, to the violation processing circuit 16, the violation detection signal VD, the violation pattern, a processor core number DPCN of a processor core which has detected the violation, a processor core number APCN of a processor core which has made the access to trigger the violation detection, and the access destination address. The determination circuit 24A determines the violation pattern.

An example of the violation access detection policies will be described here. In this embodiment, the following four access patterns are determined as a violation.

1. When another processor core makes a read access to a cache line having valid bit=1 and dirty bit=1 (the processor core which has made the read access reads data that is not the latest).

2. When another processor core makes a write access to a cache line having valid bit=1 (after the write access occurs, data that the processor core holds in the primary cache is not the latest by the write access).

3. When a processor core which is holding data in a cache line having valid bit=1, and dirty bit=1 makes a secondary cache direct read access by itself (since the latest data is stored on the primary cache of the processor core itself, the data read from the secondary cache is not the latest).

4. When a processor core which is holding data in a cache line having valid bit=1 makes a secondary cache direct write access by itself (after the write access, data that the processor core holds in the primary cache is not the latest).

Each access pattern does not necessarily correspond to one violation. Various violations may generate the same invalid access patterns. For example, assume that the processor core 11-2 accesses a cache line having valid bit=1 and dirty bit=1 in the processor core 11-1. If the cache line is an area that allows rewriting by the processor core 11-1 but inhibits access from the processor core 11-2, the access from the processor core 11-2 is invalid. Conversely, assume that an area allows access from the processor core 11-2 but inhibits writing by the processor core 11-1. If the processor core 11-1 executes a write operation in that area and consequently holds a cache line having valid bit=1 and dirty bit=1, this state is invalid.

The definition of a violation access may change depending on the system or application purpose. Accordingly, the violation access detection policies must also change. One violation access pattern may include a plurality of factors. Hence, the detection policies are set such that a violation access pattern always applies to one of the detection policies. This prevents an error in violation access detection.

Figure 4:
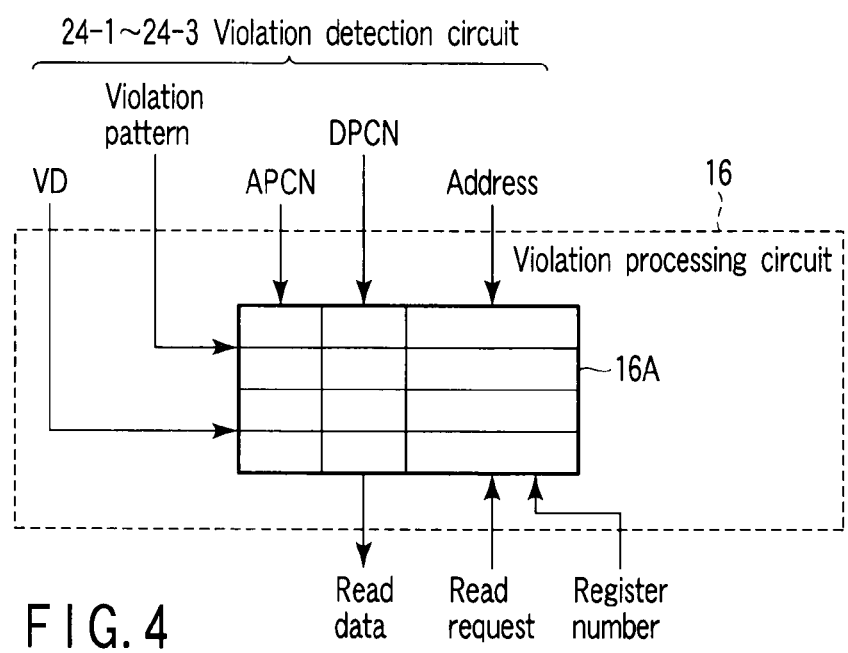
FIG. 4 is a block diagram illustrating a violation processing circuit 16 shown in FIG. 1.

The violation processing circuit 16 will the described next. FIG. 4 is a block diagram illustrating the violation processing circuit 16. The violation processing circuit 16 includes a violation information register 16A. The violation information register 16A has registers equal in number to the violation access patterns (in this embodiment, four violation access patterns).

When one of violation detection circuits 24-1 to 24-3 included in the processor cores 11-1 to 11-3, respectively, detects a violation access and asserts the violation detection signal VD, the violation processing circuit 16 writes and holds the processor core number APCN, detection processor core number DPCN, and access destination address in a register designated by the violation access pattern.

These items of violation information stored in the violation information register 16A can be read externally via a bus. More specifically, when a read request and a register number are externally sent to the violation processing circuit 16, the items of violation information in an area of the violation information register 16A corresponding to the register number are externally read via a bus as read data. The items of read violation information are used to debug the multiprocessor system.

As described above in detail, according to this embodiment, the multiprocessor system implemented on a chip can have a debugging circuit. When a violation access to the shared memory has occurred in program execution on the chip, the debugging circuit can detect the violation access.

It is possible to store violation information detected by one of the violation detection circuits 24-1 to 24-3 in the violation information register 16A of the violation processing circuit 16. This makes it possible to freely read desired violation information externally and debug a processor core using the violation information.

The valid bit, dirty bit, and address tag are elements that are always included in a general cache tag. It is unnecessary to add a new register for holding a state for each cache line to implement the debugging circuit of this embodiment.

The functions of the circuits newly added to the multiprocessor system can be disabled upon product shipping because they constitute the debugging circuit. When the functions are disabled, the circuits consume no power. For this reason, the debugging circuit that consumes large power in accordance with the increase in the number of signal changes never increases the power consumption after product shipping.

The system need not always include only one arbitration circuit 13. The system may separately include an arbitration circuit which feeds back an arbitrated access request to the primary caches 21-1 to 21-3 (i.e., an arbitration circuit which executes the operation newly added in this embodiment) and an arbitration circuit which sends the arbitrated access request to the secondary cache 14.

(Second Embodiment)

In the second embodiment, when a violation access is detected, an interrupt occurs in a processor core that has made the violation access to execute a debugging program.

FIG. 5 is a block diagram illustrating a multiprocessor system according to the second embodiment of the present invention. A path of an interrupt signal ITR is added to cause a violation processing circuit 16 to generate an interrupt for processor core, unlike FIG. 1.

Figure 6:
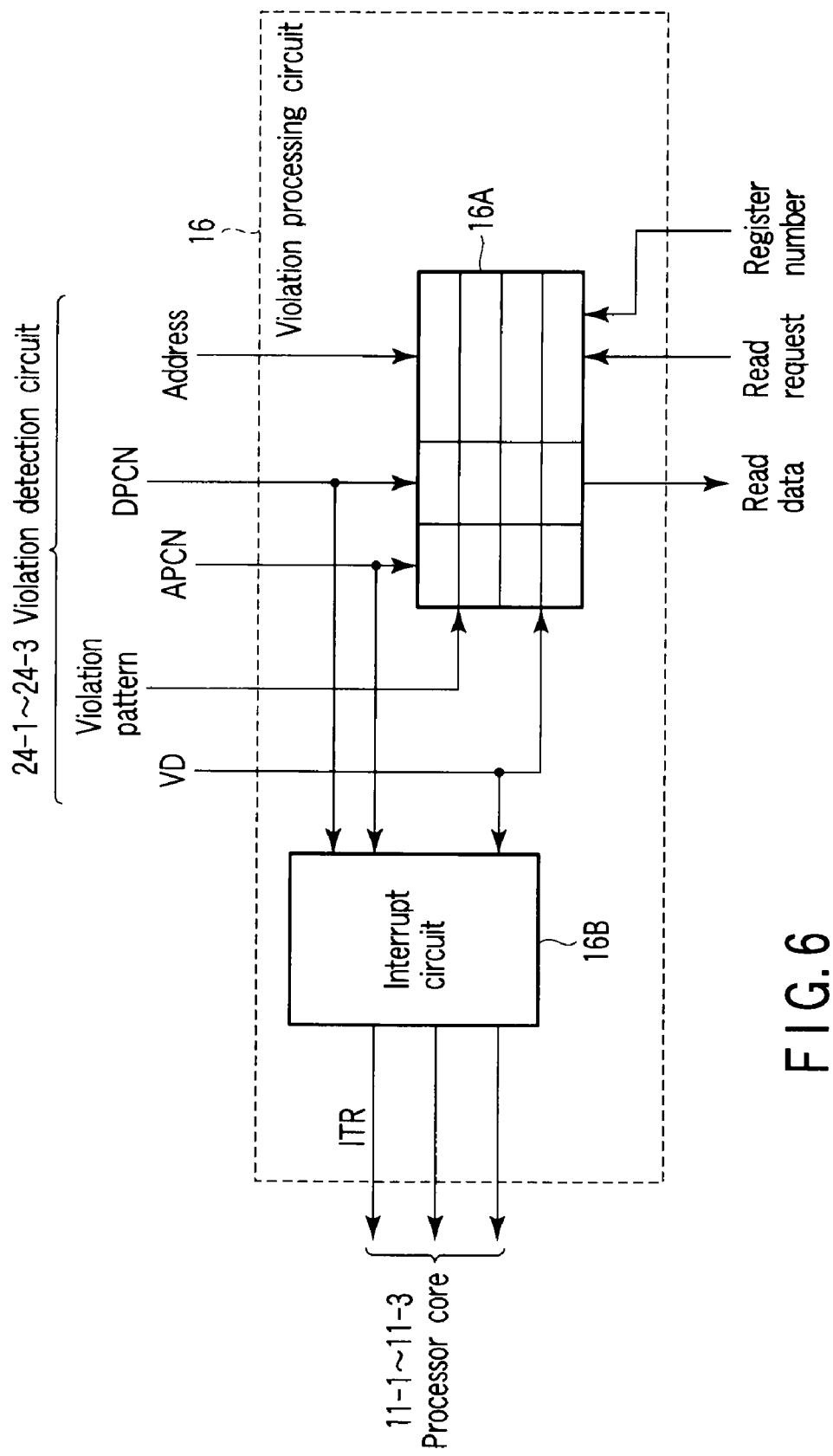
FIG. 6 is a block diagram illustrating a violation processing circuit 16 shown in FIG. 5.

FIG. 6 is a block diagram illustrating the violation processing circuit 16. The violation processing circuit 16 includes an interrupt circuit 16B. The interrupt circuit 16B receives a violation detection signal VD, a processor core number DPCN of a processor core which has detected the violation, and a processor core number APCN of a processor core which has made the access to trigger the violation detection.

When the violation detection signal VD is asserted, the interrupt circuit 16B asserts the interrupt signals ITR for the processor core which has detected the violation and is designated by DPCN and the processor core which has made the access to trigger the violation detection and is designated by APCN. After that, an interrupt is generated for each of the processor cores to externally execute the debugging program.

When debugging is ended, violation information related to the interrupt is unnecessary. Hence, the violation processing circuit 16 updates the data stored in a violation information register 16A.

As described above in detail, according to this embodiment, when a violation access is detected, the processor core that has made the violation access can be debugged. When execution of a target program is stopped to execute debugging at the time of violation access detection, the place of the problem can easily be specified as compared to a case in which the problem of violation access is analyzed after the end of the program. This shortens the time required for debugging.

(Third Embodiment)

In the second embodiment, an interrupt is generated only for a processor core which has detected a violation and a processor core which has made the access to trigger the violation detection. However, the efficiency and flexibility of debugging may be improved by selectively generating an interrupt. For example, depending on the violation access pattern, no interrupt is generated, an interrupt is generated only for a processor core that has detected a violation, or an interrupt is generated for all processor cores. In the third embodiment, a program controls an interrupt target processor core.

Figure 7:
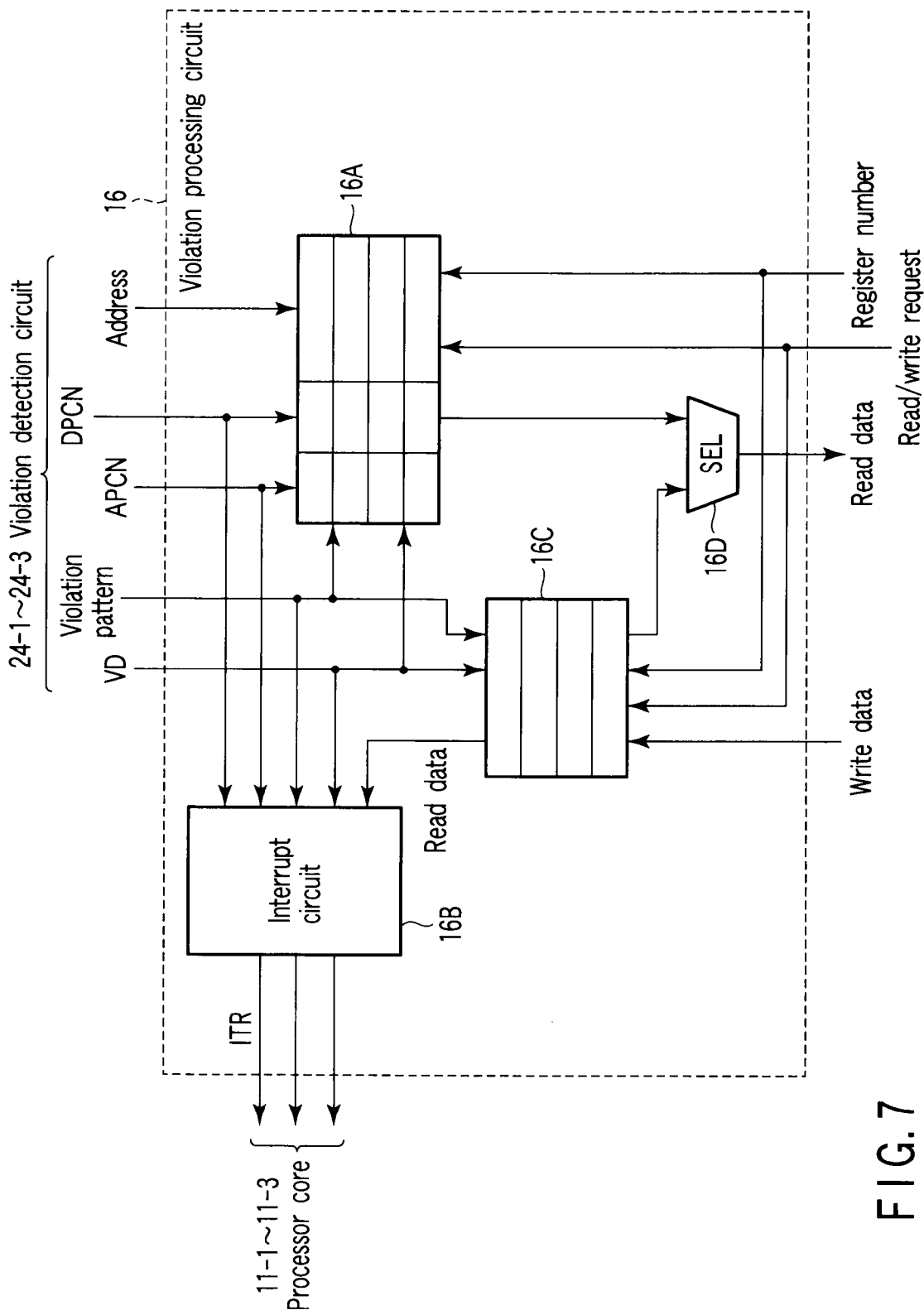
FIG. 7 is a block diagram illustrating a violation processing circuit 16 according to the third embodiment of the present invention.

FIG. 7 is a block diagram illustrating a violation processing circuit 16 according to the third embodiment of the present invention. The violation processing circuit 16 includes an interrupt setting register 16C. The interrupt setting register 16C has registers equal in number to the violation access patterns. It is possible to externally write data to the interrupt setting register 16C via a bus. More specifically, when a write request, register number, and write data are externally sent to the violation processing circuit 16 via a bus, the write data is written to an area of the interrupt setting register 16C corresponding to the register number. In this way, before the debugging function is enabled, interrupt information is written to the interrupt setting register 16C in advance, thereby setting an interrupt method to be executed upon detecting a violation access pattern.

When the system has, e.g., three processor cores, the interrupt setting register 16C has a 4-bit area for each violation access pattern. Each 4-bit interrupt information item has the following meaning.

"4'b0000": no interrupt is generated.
"4'b0001": an interrupt is generated for a processor core that has detected a violation.
"4'b0010": an interrupt is generated for a processor core that has made an access to trigger violation detection.
"4'b0011": an interrupt is generated for each of a processor core on the violation detection side and that on the access side.
"4'b01zz": Interrupts are generated for all processor cores.
"4'b1zNN": an interrupt is generated for a processor core having a processor core number 2'bNN.
(z is don't care, and N can arbitrarily be set)

The operation of the violation processing circuit 16 having the above-described arrangement will be described. An interrupt circuit 16B receives a violation pattern in addition to a violation detection signal VD and processor core numbers APCN and DPCN. When the violation detection signal VD is asserted, the interrupt circuit 16B reads interrupt information corresponding to the violation access pattern from the interrupt setting register 16C. The interrupt circuit 16B generates an interrupt for a processor core in accordance with an interrupt method set by the interrupt information.

The interrupt information stored in the interrupt setting register 16C can be read externally via a selector 16D and a bus. More specifically, when a read request and a register number are externally sent to the violation processing circuit 16, interrupt information in an area of the interrupt setting register 16C corresponding to the register number is externally read via a bus as read data.

As described above in detail, according to this embodiment, a processor core to be subjected to an external interrupt upon detecting a violation access can arbitrarily be designated in accordance with the contents of the interrupt setting register 16C that is externally writable by a program. This improves the efficiency and flexibility of debugging.

(Fourth Embodiment)

Depending on the implementation method, the number of clock cycles (number of execution cycles) in executing a program may change between a debugging circuit enable mode and a debugging circuit disable mode. This change is caused by adding a new signal to an access request in adding a debugging circuit. If the number of execution cycles changes, a problem that was not found by an enabled debugging circuit due to a specific cycle pattern may come to the fore when the debugging circuit is disabled in product shipping.

When a mechanism for changing an arbitration result of an arbitration circuit 13 at random is provided, the number of execution cycles in the debugging circuit enable mode changes in every execution. This reduces the possibility that a problem cannot come to the fore because of a specific cycle pattern. In the fourth embodiment, an example of the arbitration circuit 13 that adopts a random element for access conflict arbitration will be explained.

FIG. 8 is a block diagram illustrating the arbitration circuit 13 according to the fourth embodiment of the present invention. The arbitration circuit 13 includes a variate generation circuit 13A, three exclusive OR (XOR) circuits 13B to 13D, a priority determination circuit 13E, and a selector 13F.

The variate generation circuit 13A generates a random signal. When the system includes three processor cores, the variate generation circuit 13A generates 2 bits×3=6 random signal bits. The six random signal bits are sent to the priority determination circuit 13E.

The priority determination circuit 13E uses the six random signal bits in groups of two bits. The priority determination circuit 13E associates three 2-bit data with the three processor cores, respectively, and uses the 2-bit data to determine the priority of processor core arbitration. For example, the priority determination circuit 13E determines a high priority in descending order of 2-bit data value.

For 2-bit data having the same value, the priority determination circuit 13E XORs each 2-bit data and a processor core number and determines a high priority in descending order of XOR data value. More specifically, the XOR circuit 13B receives "2'b00" corresponding to a processor core 11-1. The XOR circuit 13C receives "2'b01" corresponding to a processor core 11-2. The XOR circuit 13D receives "2'b10" corresponding to a processor core 11-3. Each of the XOR circuits 13B to 13D also receives 2-bit data from the variate generation circuit 13A. The priority determination circuit 13E determines the priority using the outputs from the XOR circuits 13B to 13D.

The priority determination circuit 13E sends a selection signal based on the determination result to the selector 13F. The selector 13F selects one of access requests that conflict on the basis of the selection signal. In this way, the arbitration circuit 13 can arbitrate access conflict in the order of priority determined by the priority determination circuit 13E. The access request arbitrated by the arbitration circuit 13 is sent to a secondary cache 14 and violation detection circuits 24-1 to 24-3.

As described above in detail, according to this embodiment, the arbitration circuit 13 can change the arbitration result for access request conflict at random. Since the number of execution cycles when the debugging circuit is enabled can be changed in every execution, the possibility that a problem cannot come to the fore because of a specific cycle pattern can be reduced. This allows detection, before product shipping, of a violation access that may occur after product shipping.

(Fifth Embodiment)

A processor core acquires in advance data that is not yet determined as data to be actually used. Hence, the processor core can also access a memory area of the shared memory by prefetch. However, data that is read from the shared memory to the primary cache by the prefetch operation includes data not to be actually used at a high probability. For this reason, violation accesses increase due to the data not to be used.

In the fifth embodiment, a prefetch access and a non-prefetch access are separately controlled. When a read access by prefetch to a memory area of the shared memory is a violation access, the prefetch process is canceled (disabled).

FIG. 9 is a block diagram illustrating a multiprocessor system according to the fifth embodiment of the present invention. In this multiprocessor system, a prefetch identification signal PFI that identifies an access request by prefetch is added to an access request fed back from an arbitration circuit 13, unlike the arrangement of the first embodiment. A path is also added, which causes a violation processing circuit 16 to send a prefetch disable signal PFC to the primary cache of a processor core corresponding to a violation access caused by prefetch.

Figure 10:
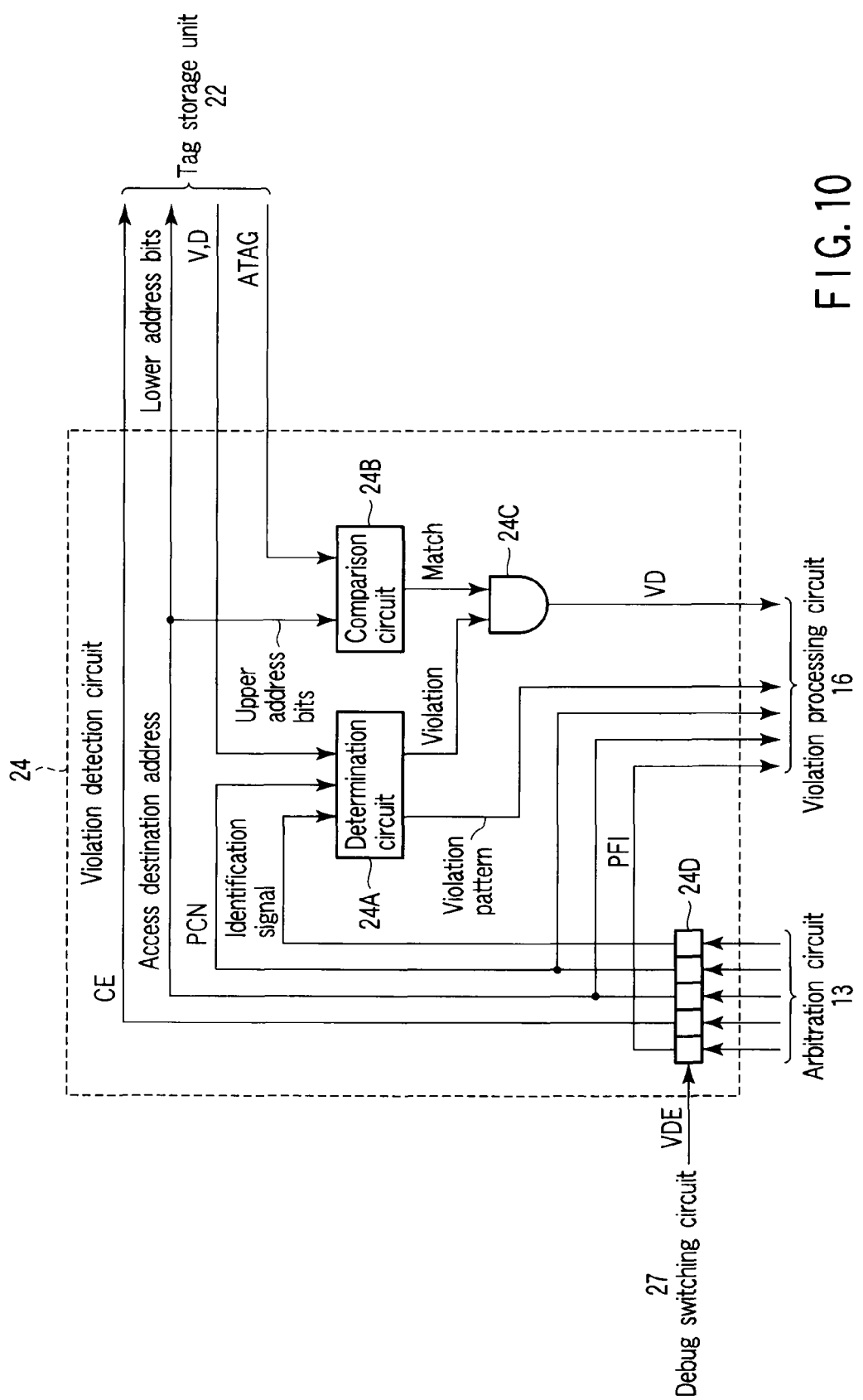
FIG. 10 is a block diagram illustrating a violation detection circuit 24 shown in FIG. 9.

FIG. 10 is a block diagram illustrating a violation detection circuit 24. An access request (chip enable CE, processor core number PCN, read/write identification signal, secondary cache direct access and primary cache refill access identification signals, access destination address, primary cache write identification signal CWI, and prefetch identification signal PFI) arbitrated by the arbitration circuit 13 is sent to the violation detection circuit 24 via the feedback path. These signals are stored in a register 24D. That is, the prefetch identification signal PFI is held in the register 24D and then sent to the violation processing circuit 16. The remaining components are the same as in FIG. 3.

Figure 11:
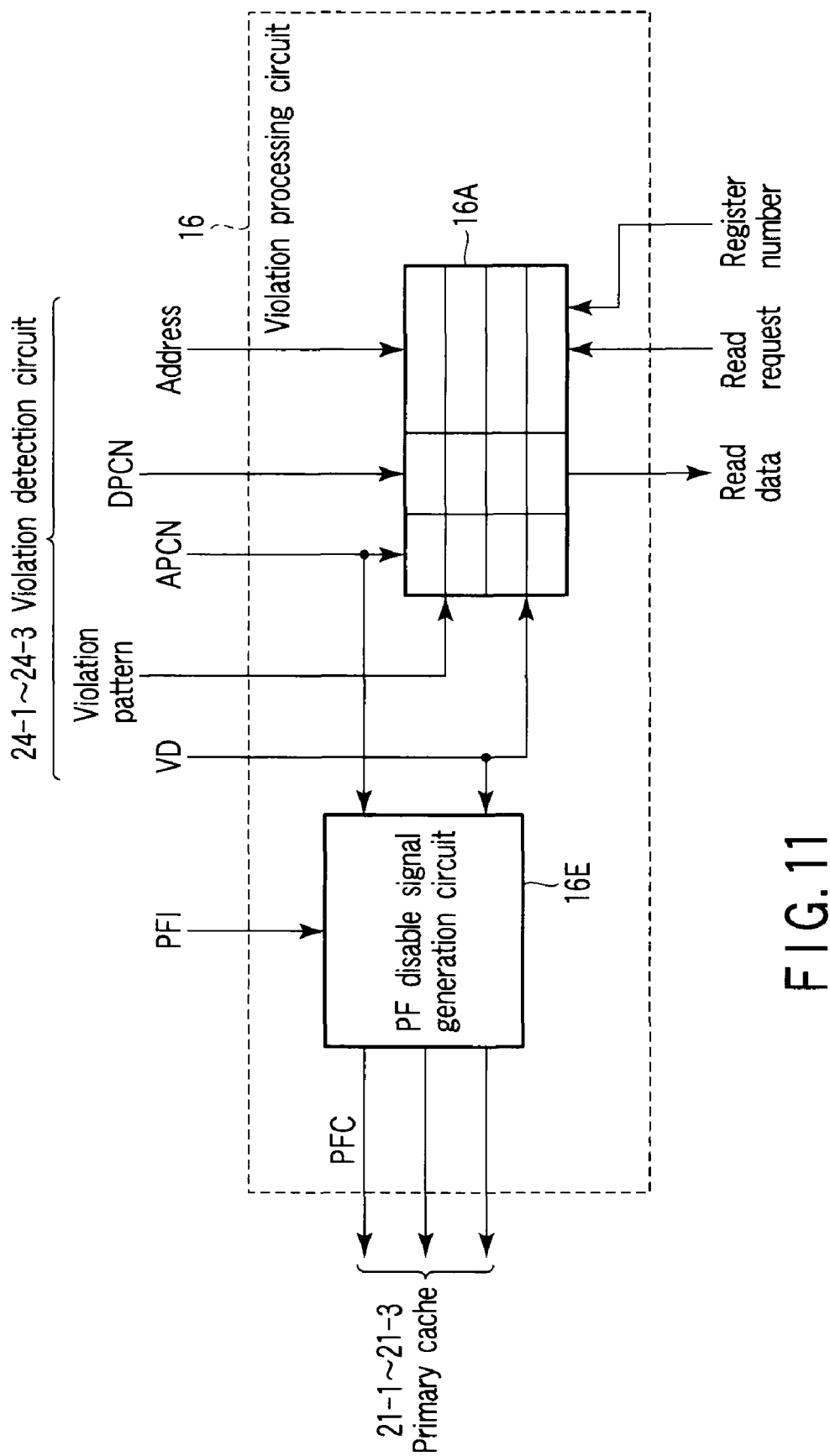
FIG. 11 is a block diagram illustrating a violation processing circuit 16 shown in FIG. 9.

FIG. 11 is a block diagram illustrating the violation processing circuit 16. The violation processing circuit 16 includes a prefetch (PF) disable signal generation circuit 16E. The PF disable signal generation circuit 16E receives the prefetch identification signal PFI, a violation detection signal VD, and a processor core number APCN of a processor core which has made an access to trigger violation detection.

If a violation access detected by the violation processing circuit 16 is an access by prefetch, the PF disable signal generation circuit 16E asserts the prefetch disable signal PFC for a primary cache 21 of the processor core corresponding to the processor core number APCN. The processor core for which the prefetch disable signal PFC is asserted disables the prefetch process that is being executed at that time.

Transfer of an access request fed back from the arbitration circuit 13 to the violation detection circuit 24 is done at a higher speed than data read from a secondary cache 14. The PF disable signal generation circuit 16E completes preparation for disabling the prefetch process before the read data by prefetch from the secondary cache 14 arrives at the primary cache 21.

As described above in detail, according to this embodiment, when data that is not yet determined to be actually used is prefetched from the shared memory, and a violation is detected in an access caused by the prefetch, the prefetch process can be disabled. This prevents an error in violation access detection. Additionally, it is unnecessary to execute debugging for a violation access caused by data that is not yet determined to be actually used.

The primary cache 21 does not store the data that should be prefetched from the shared memory. However, this poses no problem because the data can be read again for actual use by a normal access request except prefetch.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A multiprocessor system comprising:
   a plurality of processor cores to be debugged;
   a plurality of cache memories each of which is provided in correspondence with one of the processor cores and includes a tag storage unit configured to store a validity bit representing whether a cache line as a unit to store data is valid, a dirty bit representing whether data in the cache line has been rewritten, and address information of the data in the cache line;
   a shared memory shared by the processor cores;
   an arbitration circuit configured to arbitrate a plurality of access requests from the processor cores to the shared memory and send the arbitrated access request to the cache memories, each of the access requests including a first identification signal for identifying an access in which the dirty bit has been rewritten; and
   an interrupt circuit configured to generate an interrupt for a processor core upon detecting a violation access,
   wherein each cache memory includes a violation detection circuit configured to detect a violation access by comparing the information in the tag storage unit with the access request from the arbitration circuit, and
   the violation detection circuit determines the violation access when
   (a) another processor core makes a read access to the cache line having valid bit =1 and dirty bit =1,
   (b) another processor core makes a write access to the cache line having valid bit =1,
   (c) the processor core which is holding data in the cache line having valid bit =1 and dirty bit =1 makes a read access to the cache line by itself, or
   (d) the processor core which is holding data in the cache line having valid bit =1 makes a write access to the cache line by itself;
   the violation detection circuit generates violation information about the detected violation access,
   the interrupt circuit receives the violation information, specifies a processor core of an interrupt target using the violation information, and changes a condition of the processor core of the interrupt target on the basis of interrupt information, and
   the interrupt information is set for each violation access pattern, contains the number of processor cores of the interrupt target, and is rewritable from the outside.

2. The system according to claim 1, wherein the arbitration circuit sends the arbitrated access request also to the shared memory.

3. The system according to claim 1, wherein the cache memory includes a transition detection circuit configured to generate the first identification signal by detecting transition of the dirty bit before and after data is written to a cache line.

4. The system according to claim 1, which further comprises a switching circuit configured to enable/disable the debugging, and
   in which the cache memory detects the violation access when the debugging is enabled.

5. The system according to claim 4, wherein setting data of the switching circuit can be externally rewritten.

6. The system according to claim 1, wherein the violation detection circuit generates violation information about the detected violation access.

7. The system according to claim 6, further comprising a violation processing circuit which is externally accessible and includes a first register to store the violation information.

8. The system according to claim 6, wherein the violation information contains a violation access pattern, a processor core number of a processor core which has made the violation access, and address information of a violation access destination.

9. The system according to claim 1, wherein the violation detection circuit includes a determination circuit configured to determine using predetermined violation access patterns whether an access of a processor core has a violation access pattern.

10. The system according to claim 1, wherein the violation detection circuit includes a comparison circuit configured to compare a first address contained in the arbitrated access request with a second address stored in a cache line corresponding to the arbitrated access request in the tag storage unit.

11. The system according to claim 1, wherein each of the processor cores performs a prefetch operation of reading data to the cache memory before actual use.

12. The system according to claim 11, wherein the access request contains a second identification signal representing whether the access request indicates the prefetch operation.

13. The system according to claim 12, further comprising a disabling circuit configured to receive the second identification signal and, upon detecting the violation access that indicates a prefetch operation, disable the prefetch operation.

14. The system according to claim 1, further comprising a second register configured to store the interrupt information.

15. The system according to claim 1,
wherein the arbitration circuit changes, at random, priority orders of the processor cores to be allocated when accesses from the processor cores conflict.

16. The system according to claim 15, wherein the arbitration circuit includes a generation circuit configured to generate a variate, and a determination circuit configured to determine priorities of the processor cores using the variate.

17. The system according to claim 16, wherein the arbitration circuit includes a selection circuit configured to select one of the access requests from the processor cores on the basis of the priorities.

* * * * *

UNITED STATES PATENT AND TRADEMARK OFFICE
CERTIFICATE OF CORRECTION

| | | |
|---|---|---|
| PATENT NO. | : 8,380,933 B2 | Page 1 of 1 |
| APPLICATION NO. | : 12/053862 | |
| DATED | : February 19, 2013 | |
| INVENTOR(S) | : Masato Uchiyama | |

It is certified that error appears in the above-identified patent and that said Letters Patent is hereby corrected as shown below:

On the title page, Item (30), the Foreign Application Priority Data should read:

--(30)     Foreign Application Priority Data

Mar. 29, 2007   (JP).............................2007-087188--

Signed and Sealed this
Sixteenth Day of April, 2013

Teresa Stanek Rea
*Acting Director of the United States Patent and Trademark Office*